United States Patent [19]
Yokoyama et al.

[11] Patent Number: 5,448,374
[45] Date of Patent: * Sep. 5, 1995

[54] FACSIMILE APPARATUS AND ROLL-LIKE SHEET HOLDER

[75] Inventors: Minoru Yokoyama; Toshio Kenmochi; Yosuke Ezumi, all of Yokohama; Masakatsu Yamada, Kawasaki; Hisashi Toyoda, Yokohama; Hideyuki Terashima, Sagamihara, all of Japan

[73] Assignee: Canon Kabushiki Kaisha, Tokyo, Japan

[*] Notice: The portion of the term of this patent subsequent to Jan. 3, 2012 has been disclaimed.

[21] Appl. No.: 3,104

[22] Filed: Jan. 11, 1993

[30] Foreign Application Priority Data

Jan. 14, 1992 [JP]  Japan .................................. 4-004570
Jan. 14, 1992 [JP]  Japan .................................. 4-004571

[51] Int. Cl.⁶ ..................... H04N 1/00; H04N 1/04; H04N 1/21
[52] U.S. Cl. .................... 358/400; 358/498; 358/496; 358/296
[58] Field of Search ............... 358/400, 401, 473, 498, 358/496, 296, 298, 474

[56] References Cited

U.S. PATENT DOCUMENTS

| | | | |
|---|---|---|---|
| 4,652,937 | 3/1987 | Shimura et al. | 358/473 |
| 5,182,655 | 1/1993 | Motoyanagi | 358/400 |
| 5,229,869 | 7/1993 | Kibuchi et al. | 358/473 |

FOREIGN PATENT DOCUMENTS

| | | |
|---|---|---|
| 0297566 | 1/1989 | European Pat. Off. . |
| 0361459 | 4/1990 | European Pat. Off. . |
| 58-129874 | 8/1983 | Japan . |
| 60-106272 | 6/1985 | Japan . |

OTHER PUBLICATIONS

Patent Abstracts of Japan, vol. 7, No. 239 (E-206) (1384) Oct. 25, 1983.

Primary Examiner—Edward L. Coles, Sr.
Assistant Examiner—Allan A. Esposo
Attorney, Agent, or Firm—Fitzpatrick, Cella, Harper & Scinto

[57] ABSTRACT

A facsimile apparatus selectively uses a cut recording sheet or a roll-like recording sheet. The facsimile apparatus has a housing, constituting the outer surface of the apparatus. An original reading section is provided for conveying an original between a first opening portion, formed in a front portion of the upper surface of the housing, and a front surface opening portion, formed in a front surface of the housing. A recording section is provided for inserting a recording sheet through a second opening portion, formed in the upper surface of the housing at a position closer to the rear side than the first opening portion and for discharging the recording sheet through the first opening portion. A roll-like sheet holder supplies a roll-like recording sheet from a rear portion of the housing.

13 Claims, 13 Drawing Sheets

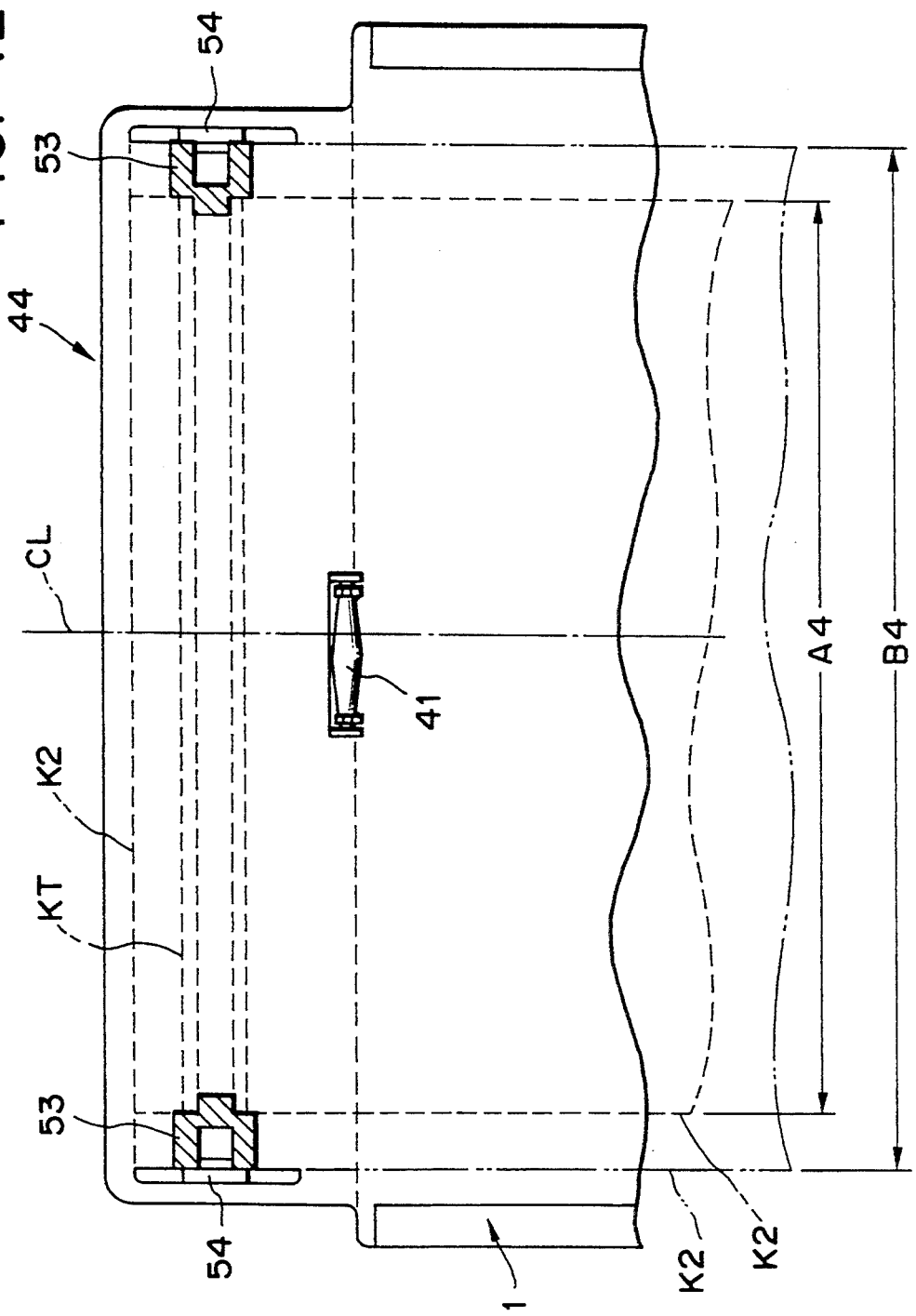

FACSIMILE APPARATUS AND ROLL-LIKE SHEET HOLDER

BACKGROUND OF THE INVENTION

The present invention relates a facsimile apparatus and a roll-like sheet holder.

A facsimile apparatus incorporating a roll-like sheet holder has been conventionally proposed. This apparatus will be briefly described below with reference to FIG. 13. FIG. 13 is a cross-sectional view of the conventional facsimile apparatus, which is considered to have the most compact, flattest structure at present. Referring to FIG. 13, a first opening portion 203 is formed in the upper surface of a housing cover 200, which also serves as a housing, at a position near an edge portion thereof. A second opening portion 204 is formed in the upper surface of the housing cover 200 at a backward position (on the rear surface side) with respect to the first opening portion 203. In addition, a discharge port 205 is formed in the front surface of the housing cover 200.

In the above arrangement, an original G is inserted, with its image surface facing down, through the first opening portion 203. The inserted original G is clamped between a contact line image sensor 12 and a first biasing roller 13 which is pivoted in a biased state with respect to the contact line image sensor 12. The original G is then conveyed and discharged from the discharge port 205.

On the inner surface of the upper wall of the housing cover 200, as shown in FIG. 13, a roll-like recording paper KR, which is a roll of thermal recording paper, is held to be movable in a direction of an arrow and replaceable. The color development surface of roll paper K2 is set to oppose the recording portion of a line thermal head 14 constituting the recording section. At the same time, the roll paper K2 is clamped between the line thermal head 14 and a second biasing roller 15 which is pivoted in a biased state with respect to the line thermal head 14, and is discharged outside through the second opening portion 204 after a recording operation.

With the above-described arrangement, the reading portion and the recording portion are prevented from overlapping each other in the direction of height, thereby reducing the height of the housing cover 200.

In the above-described facsimile apparatus, however, only roll-like thermal recording paper KR is supported on the inner surface of the upper wall of the housing cover 200 so as to be incorporated. For this reason, the housing requires at least a space, as an extra depth, for storing the roll-like recording paper. Therefore, a further reduction in the depth of the housing cannot be achieved.

In addition, since the above facsimile apparatus is designed to use only roll-like recording paper, a so-called cut sheet consisting of thermal recording paper, e.g., an A4 size sheet, cannot be set in the recording section. More specifically, in order to set such a cut sheet in the recording section, a cumbersome operation is required. For example, a cut sheet may be set after roll-like recording paper is removed. Therefore, it is practically impossible to set a cut sheet in the recording section. If an opening portion specially designed for the insertion of a cut sheet is to be formed, for example, near the above-mentioned first opening portion, the strength of a bar-like partition portion formed between the first opening portion and the opening portion having a longitudinal size larger than at least the width of an A4 size sheet cannot be guaranteed. In practice, therefore, setting of a cut sheet cannot be performed.

SUMMARY OF THE INVENTION

The present invention has been made in consideration of the above situation, and has as its object to provide a facsimile apparatus which can selectively use a cut sheet and a roll-like recording sheet and can be designed to be compact and flat.

It is another object of the present invention to provide a portable facsimile apparatus which can be used in any place.

It is still another object of the present invention to provide a roll-like sheet holder for a facsimile apparatus, which can prevent damage to the recording surface of a roll-like recording sheet and its meandering/slanting movement.

It is still another object of the present invention to provide a roll-like sheet holder for a facsimile apparatus, which can supply roll-like recording sheets having different widths.

In order to solve the above problems and achieve the above objects, the present invention has the following arrangements.

A facsimile apparatus comprises a housing constituting an outer surface of the facsimile apparatus, an original reading section for conveying an original between a first opening portion formed in a front portion of an upper surface of the housing and a front surface opening portion formed in a front surface of the housing, a recording section for inserting a recording sheet through a second opening portion formed in the upper surface of the housing at a position closer to a rear side than the first opening portion and for discharging the recording sheet through the first opening portion, and a roll-like sheet holder for supplying a roll-like recording sheet from a rear portion of the housing. The apparatus can be arbitrarily set in a state wherein a cut sheet is inserted through the second opening portion and is discharged from the first opening portion, and a state wherein a roll-like recording sheet held on the roll-like sheet holder is inserted through the second opening portion and is discharged from the first opening portion.

Preferably, there is provided a facsimile apparatus comprising a housing constituting an outer surface of the facsimile apparatus, an original reading section for conveying an original between a first opening portion formed in a front portion of an upper surface of the housing and a front surface opening portion formed in a front surface of the housing, a recording section for inserting a recording sheet through a second opening portion formed in the upper surface of the housing at a position closer to a rear side than the first opening portion and for discharging the recording sheet through the first opening portion, a control section arranged on a rear side of the recording section, a battery storage portion detachably held in the housing at a position closer to a rear end thereof than the control section, and a roll-like sheet holder for supplying a roll-like recording sheet from a rear portion of the housing, wherein the original reading section, the recording section, the battery storage portion, and the roll-like sheet holder are sequentially arranged from the front surface of the housing. With this arrangement, the height of the facsimile apparatus can be reduced, and the apparatus can be used in a place where no commercial power supply is available.

In addition, there is preferably provided a roll-like sheet holder for continuously supplying a roll-like recording sheet to a facsimile apparatus having at least a recording section through a supply port of the recording section, wherein the recording sheet is supported to be rotatable with a recording surface thereof facing outside and allow the continuous supply of the recording sheet. With this arrangement, the holder operates to supply a predetermined amount of a roll-like recording sheet.

Furthermore, there is preferably provided a roll-like sheet holder for continuously supplying a roll-like recording sheet to a facsimile apparatus having at least a recording section through a supply port of the recording section, comprising a storage portion for supporting a recording sheet to be rotatable with a recording surface thereof facing outside and allow the continuous supply of the recording sheet, and a slanting movement preventing member, arranged near a downstream portion of the storage portion, for preventing meandering/slanting movement of the recording sheet, and guiding the recording sheet between the supply port and itself with the recording sheet being kept separated from the facsimile apparatus. With this arrangement, the holder operates to prevent meandering/slanting movement of a recording sheet while the recording sheet is supplied.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a plan view showing part of the roll sheet holder 40 and the ultra compact facsimile apparatus 1 after they are combined with each other.

DETAILED DESCRIPTION OF THE PREFERRED EMBODIMENTS

Figure 1A:
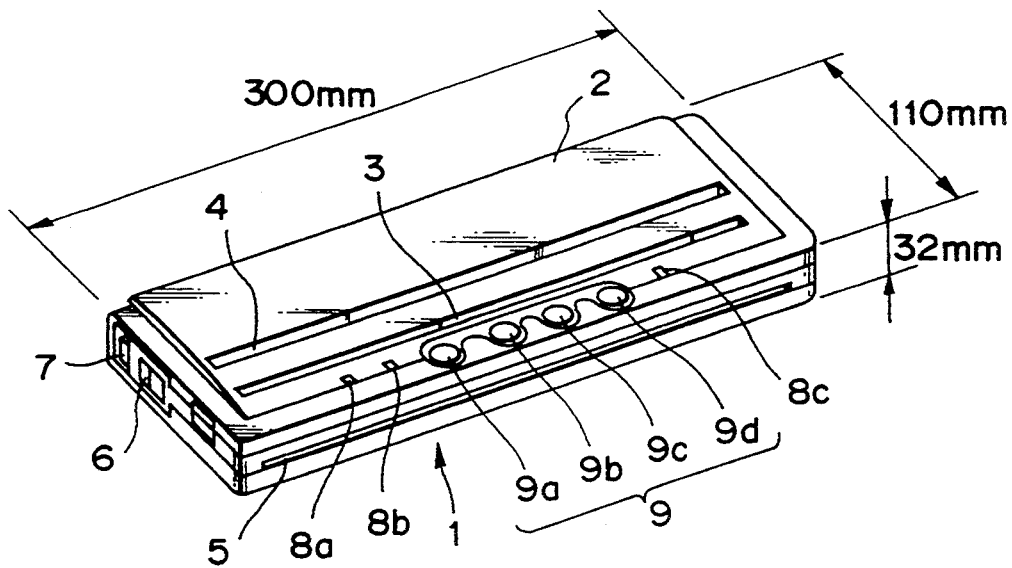
FIG. 1A is a perspective view showing the outer appearance of an ultra compact facsimile apparatus according to the first embodiment of the present invention.
Figure 1B:
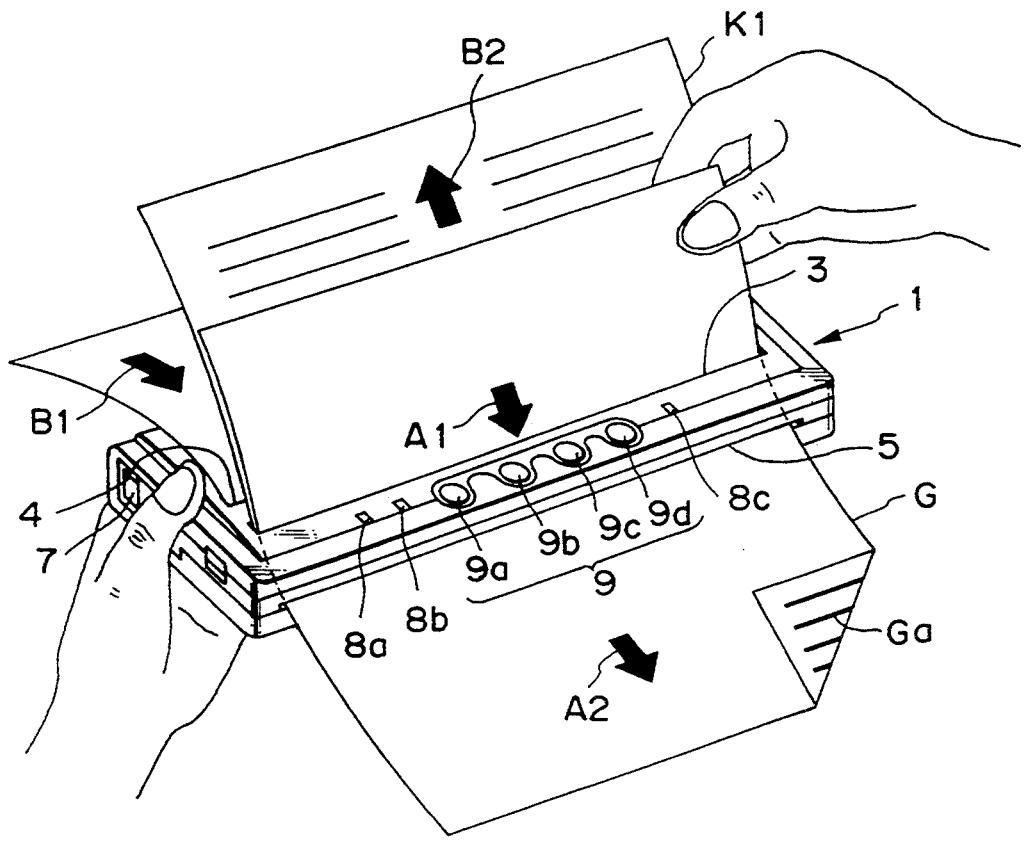
FIG. 1B is a perspective view showing the outer appearance of the ultra compact facsimile apparatus according to the first embodiment in a used state.

Embodiments of the present invention will be described in detail below with reference to the accompanying drawings. FIG. 1A is a perspective view showing the outer appearance of a facsimile apparatus 1 according to the first embodiment of the present invention, which apparatus is in a state wherein neither an original nor a recording sheet are set. FIG. 1B is a perspective view showing the outer appearance of the facsimile apparatus 1 in a state wherein an original G and a recording sheet K1 are set and are conveyed in directions of arrows, respectively.

Referring to FIG. 1A, a housing cover 2 is a resin cover member which is formed by resin injection molding such that the cover can be separated into upper and lower parts. As indicated by the dimensions in FIG. 1A, since the housing cover 2 has small outer dimensions, i.e., a width of 300 mm, a depth of 110 mm, and a height of 32 mm, the apparatus can be easily stored in an ordinary business bag. In addition, the apparatus incorporates a battery power supply and a facsimile function (both will be described later). Therefore, if only this portable facsimile apparatus is connected to a predetermined telephone line, the apparatus can be used in any place, e.g., outdoors and in an automobile. That is, the apparatus can be used as a so-called portable facsimile apparatus. Furthermore, the apparatus can satisfy demand for a reduction in the size of a facsimile apparatus.

As shown in FIG. 1A, first and second opening portions 3 and 4 are formed in the upper surface of the housing cover 2 of the facsimile apparatus 1 having the above-mentioned outer dimensions. The first opening portion 3 has a longitudinal size allowing an original having a width equal to that of a B4 size sheet to be inserted therein. The second opening portion 4 similarly has a longitudinal size allowing a recording sheet having a width equal to that of a B4 size sheet to be inserted therein. In addition, a discharge port 5 is formed in the front surface of the housing cover 2 so as to allow a B4 size original to be discharged therefrom.

An operation switch section 9 is arranged near an edge portion on the upper surface of the housing cover 2. The operation switch section 9 includes a fine/normal mode setting switch 9a, a copy/field mode setting switch 9b, a stop switch 9c, and a start switch 9d for starting a transmission mode in the presence of a sheet, and a reception mode in the absence of a sheet. An LED 8c for displaying a power ON state is arranged on the right side of the operation switch section 9, while an LED 8a for displaying an operation error and an LED 8b for displaying a fine mode set state are arranged on the left side of the operation switch section 9. These LEDs are arranged almost in a line. A power switch 7 and an external connector 6 for connection with a telephone are arranged on the left side surface of the facsimile apparatus 1.

In the facsimile apparatus 1 having the abovedescribed arrangement, as shown in FIG. 1B, an original G is inserted, with an image surface Ga facing down, through the first opening portion 3 in the direction indicated by an arrow A1, and is discharged outside through the discharge port 5. On the other hand, a cut sheet K1 consisting of thermal recording paper is inserted through the second opening portion 4 in the direction indicated by an arrow B1, and is discharged from the first opening portion 3 in the direction indicated by an arrow B2 (upward). With this arrangement, an original reading operation and a recording operation in the facsimile apparatus can be performed in units of cut sheets.

With the above-described arrangement, the facsimile apparatus 1, which is formed into a flat, compact structure, is held in one hand of a user, and originals can be inserted one by one with the other hand. In the reception mode, reception can be performed by setting only a thermal recording cut sheet K1 through the second opening portion 4. In the copy mode, by simultaneously setting the original G and the cut sheet K1, copies can be made one by one without making line connection.

Figure 2:
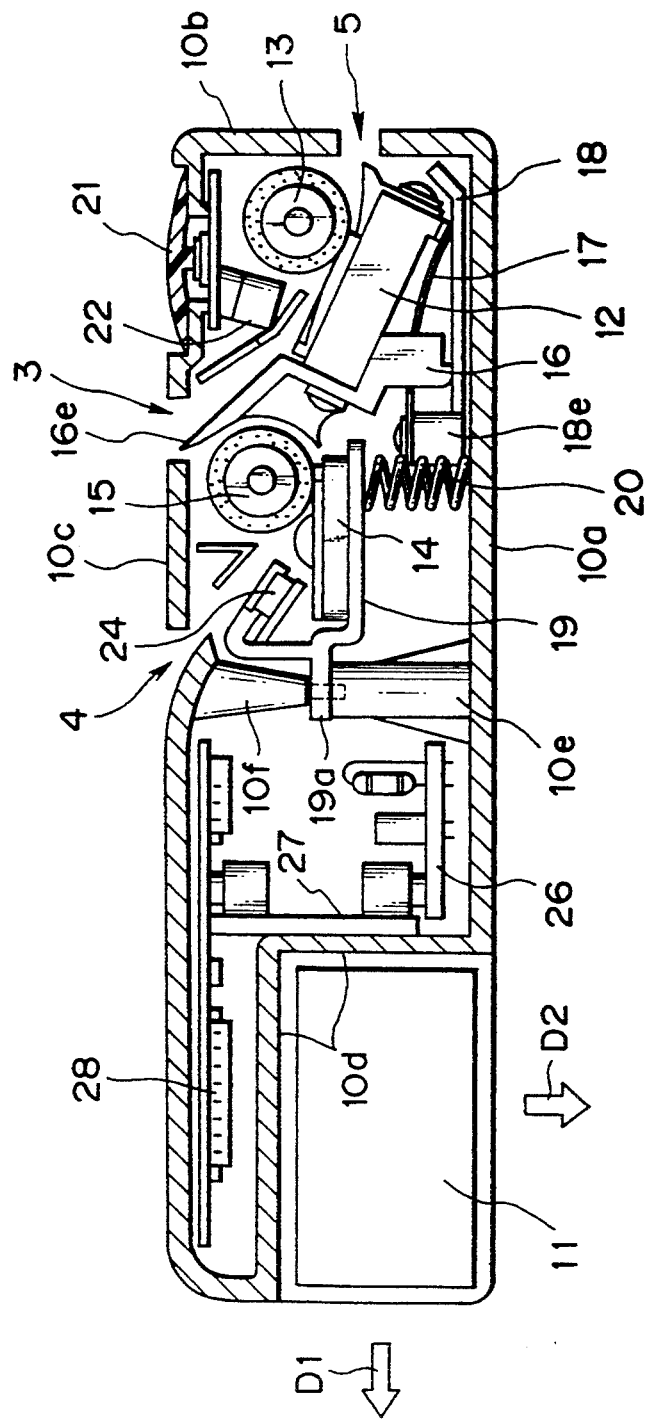
FIG. 2 is a cross-sectional view of the apparatus in FIGS. 1A and 1B.

The internal arrangement of the apparatus will be described next with reference to FIG. 2. FIG. 2 is a cross-sectional view taken along a plane crossing one of the switches constituting the operation switch section 9 of the facsimile apparatus 1 shown in FIGS. 1A and 1B, illustrating the arrangement of the main part inside the apparatus. Referring to FIG. 2, the above-described housing cover 2 is constituted by a cover bottom plate 10a, a cover upper plate 10c, a cover front plate 10b, a battery storage portion 10d, and the like in the form of a box, in which the respective components can be incorporated. The first and second opening portions 3 and 4 are formed in the cover upper plate 10c, as shown in FIG. 2, while the discharge port 5 is formed almost at the center of the cover front plate 10b. In addition, a switch cover 21 also having a display function covers the operation switch section 9.

The arrangement of the original reading section will be described below. A CS roller 13 as a firsgt biasing roller serves to bring the original G into tigt contact with the original reading portion of a contact sensor 12 to obtain a frictional force, thus conveying the original G. The CS roller 13 is pivotally supported on both sides of a sheet metal base 18 which is bent upward.

In the arrangement in which the outer surface of the CS roller 13 is always set in a biased state with respect to the reading portion of the contact sensor 12, the contact sensor 12 is fixed to a sensor base plate 16 swingably supported on the sheet metal base 18. The integral structure constituted by the sensor base plate 16 and the contact sensor 12 is always biased against the CS roller 13 by a spring 17 having one end fixed to a stud 18e integrally formed on the sheet metal base 18. The sensor base plate 16 has a cross-sectional shape shown in FIG. 2. More specifically, the sensor base plate 16 guides the original G, and has a sharp distal end portion 16e and also has a portion extending along the outer surface of a TPH roller 15 of the recording section (to be described below). With this structure, a cut sheet is guided to the first opening portion 3, and paper can be cut with the distal end portion 16e.

The arrangement of the recording section will be described below. The TPH roller 15 as the second biasing roller for conveying the thermal recording cut sheet K1 is pivotally supported on the sheet metal base 18. The TPH roller 15 brings the cut sheet K1 into tight contact with the recording portion of a line thermal head 14 to obtain a frictional force, thus conveying the cut sheet K1. In order to set such a tight contact state, the outer surface of the TPH roller 15 is always set in a biased state with respect to the recording portion of the line thermal head 14. In order to set this state, the line thermal head 14 is fixed to a thermal head board 19, as shown in FIG. 2. More specifically, the thermal head board 19 is swingably held between studs 10f and 10e through a hole 19a formed in the board 19 so as not to be slipped off. The stud 10f extends from the inner surface of the second opening portion 4. The stud 10e extends upright from the cover bottom plate 10a. The thermal head board 19 is biased by a coil spring 20 held between the lower surface of the board 19 and the sheet metal base 18 in a compressed state, thereby always biasing the recording portion of the line thermal head 14 against the TPH roller 15.

In order to drive the CS roller 13 and the TPH roller 15 while they are kept in a biased state, the coefficient of friction of each roller with respect to the reading portion of the contact sensor 12 or the recording portion of the line thermal head 14 may be set to be smaller than that of each roller with respect to an original or a recording sheet. Therefore, a special material is used for the outer surfaces of the CS roller 13 and the TPH roller 15 instead of a rubber material. In this way, an original convey path for an original and a sheet convey path for the recording sheet are constructed.

An electronic board for executing the facsimile function is constituted by a chip board 28 and a discrete board 26 which are respectively arranged along the upper and lower inner surfaces of the housing cover 2, as shown in FIG. 2. The chip board 28 has LSI chips, IC chips, chip parts, and the like mounted on its surface. On the discrete board 26, resistors, capacitors, diodes, and the like are mounted through a reflow solder bath. Connection of this electronic board is made through a connector board 27. With this arrangement, the manufacturing process of each board can be simplified, and the storage space for the electronic board can be efficiently ensured in accordance with a reduction in the size of the apparatus.

A rechargeable battery 11 is stored in the abovementioned battery storage portion 10d to be detachable in the directions indicated by arrows D1 and D2 in FIG. 2. As this rechargeable battery 11, for example, a nickel-cadmium battery capable of generating high power can be used.

In the above-described arrangement, as shown in FIG. 1B, when the original G is inserted, with the image surface Ga facing down, through the first opening portion 3 in the direction indicated by the arrow A1, a predetermined reading operation is performed at the reading section. Thereafter, the original G is discharged outside through the discharge port 5. On the other hand, when the thermal recording cut sheet K1 is inserted through the second opening portion 4 in the direction indicated by the arrow B1, a predetermined recording operation is performed at the recording section. Thereafter, the cut sheet K1 is discharged from the first opening portion 3 in the direction indicated by the arrow B2 (upward). In this manner, an original reading operation and a recording operation in the facsimile apparatus can be performed in units of cut sheets.

Figure 3:
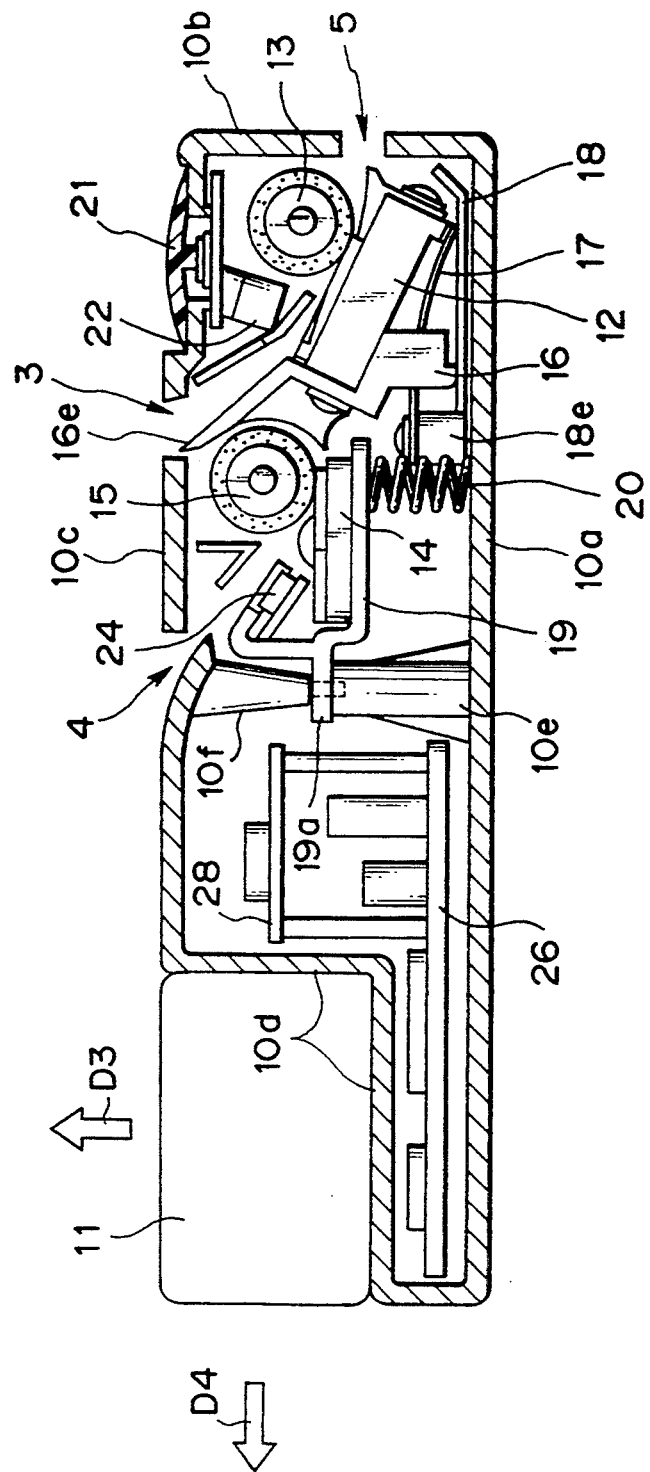
FIG. 3 is a cross-sectional view of an ultra compact facsimile apparatus according to the second embodiment of the present invention.

FIG. 3 is a cross-sectional view showing a compact facsimile apparatus 1 according to the second embodiment of the present invention. Since the arrangements of the reading and recording sections of the second embodiment are almost the same as those of the first embodiment described above, only different portions will be described below. Referring to FIG. 3, a cover battery storage portion 10d is formed to be continuous with the upper and lower surfaces of the housing so as to allow a rechargeable battery 11 to be detachable in the directions indicated by arrows D3 and D4. In addition, a chip board 28 and a discrete board 26 are disposed through a spacer to form a two-story structure, as shown in FIG. 3.

In the above arrangement, similar to the first embodiment, as shown in FIG. 1B, when an original G is inserted, with an image surface Ga facing down, through a first opening portion 3 in the direction indicated by the arrow A1, a predetermined reading operation is performed at the reading section. Thereafter, the original G is discharged outside through a discharge port 5. On the other hand, when a thermal recording cut sheet K1 is inserted through a second opening portion 4 in the direction indicated by the arrow B1, a predetermined recording operation is performed at the recording section. Thereafter, the cut sheet K1 is discharged from the first opening portion 3 in the direction indicated by the arrow B2 (upward). In this manner, an original reading operation and a recording operation in the facsimile apparatus can be performed in units of cut sheets.

Figure 4:
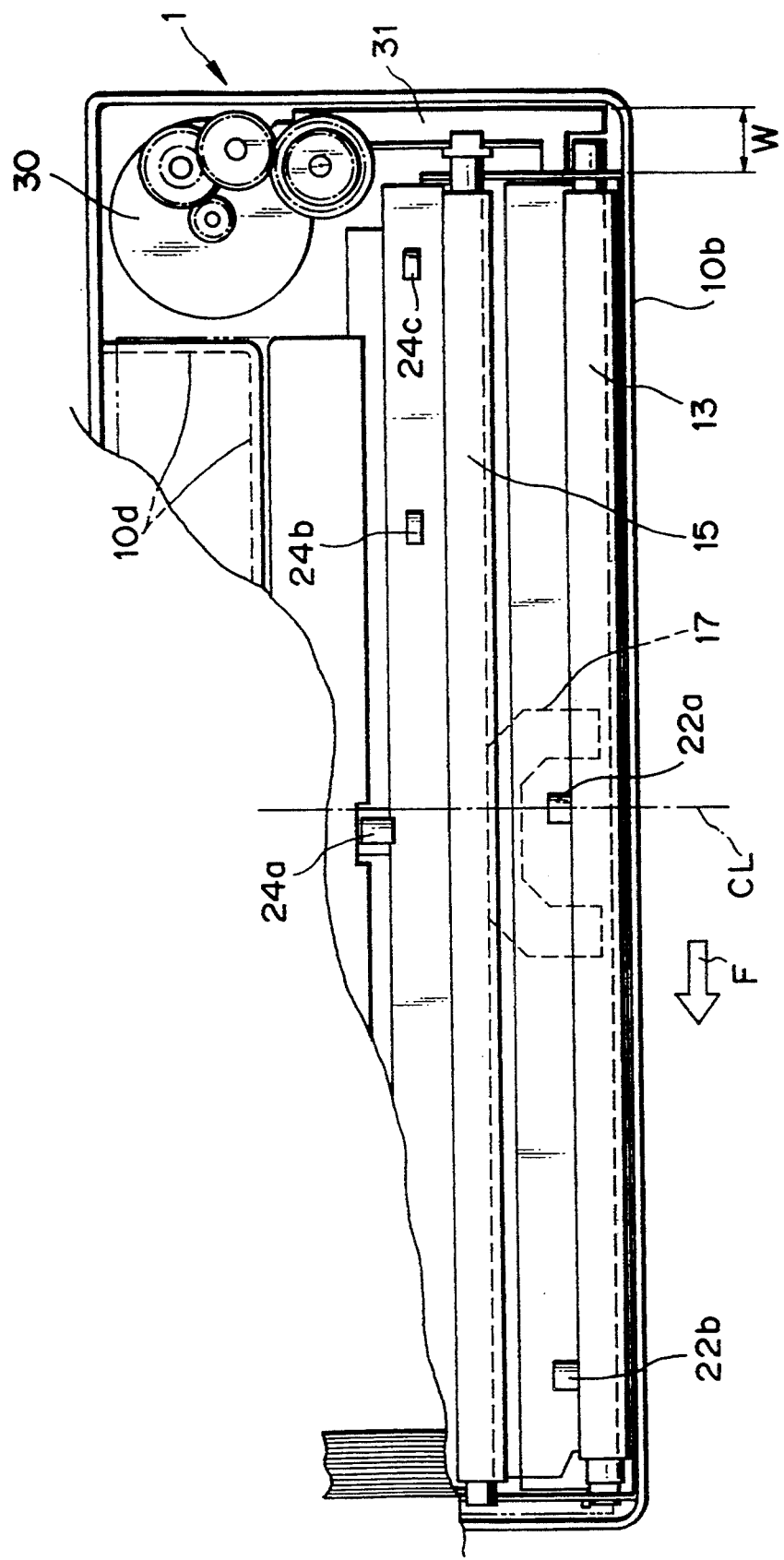
FIG. 4 is a plan view of the ultra compact facsimile apparatus according to the first and second embodiments.

FIG. 4 is a plan view of a facsimile apparatus 1 in a state wherein the reading section and the recording section are offset to the left (in the direction indicated by an arrow F) with respect to a central line CL of the apparatus. The reading and recording sections will be described below with reference to the locations of a CS roller 13 and a TPH roller 15 in FIG. 4. The central positions of the rollers 13 and 15 in their longitudinal directions are offset to the left (the direction indicated by the arrow F in FIG. 4) with respect to the central line CL so as to ensure a space having a width W in the housing of the apparatus. A gear train 31 is disposed in this space to allow transmission of the driving force of a pulse motor 30 as a driving source for each roller.

DES sensors 22a and 22b for respectively detecting the presence/absence of originals having difference sizes, and RPS sensors 24a, 24b, and 24c for respectively detecting the presence/absence of recording sheets having difference sizes are respectively arranged in the reading and recording sections at the respective positions shown in FIG. 4.

Figure 5:
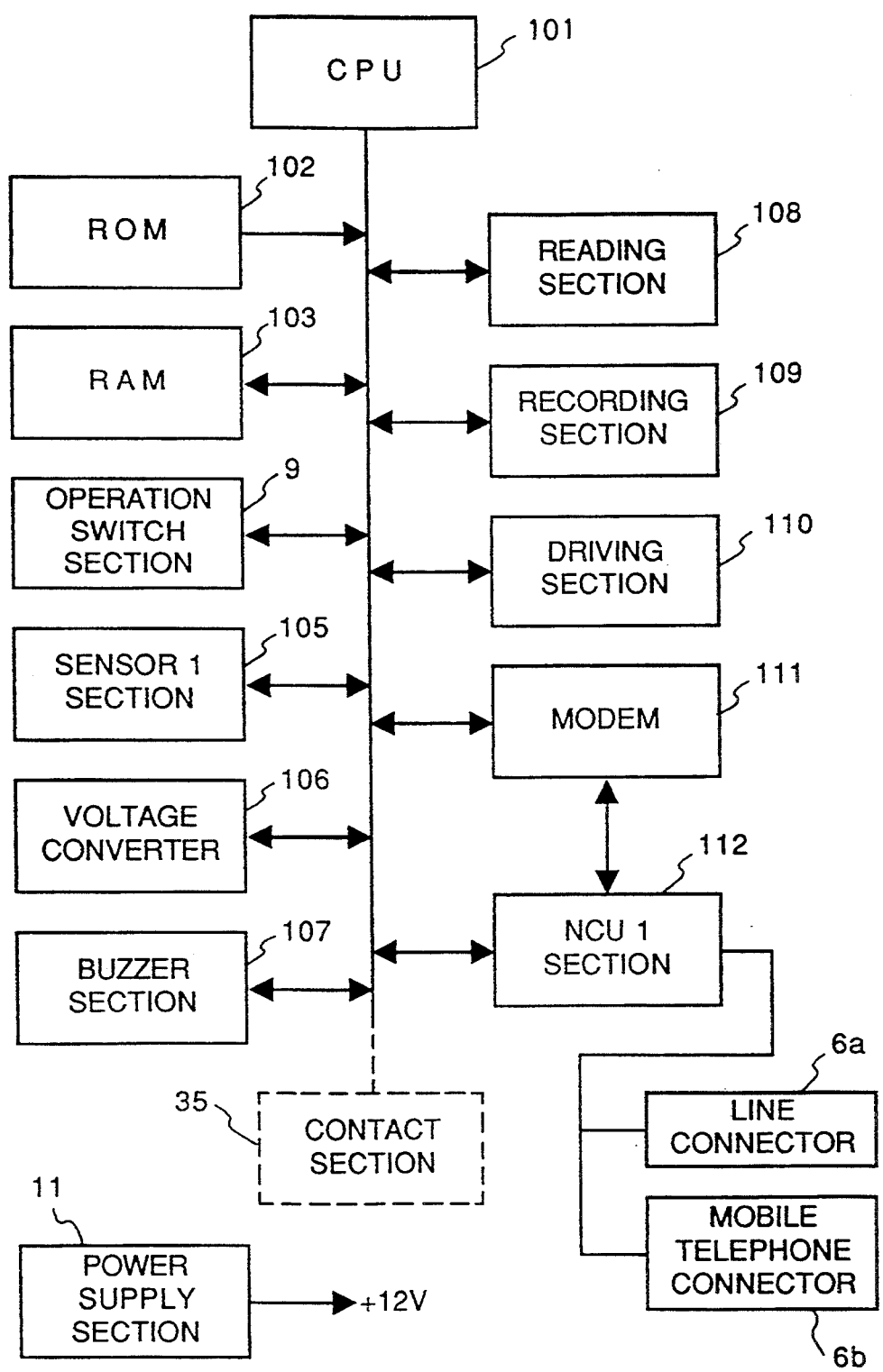
FIG. 5 is a block diagram of the ultra compact facsimile apparatus according to the first and second embodiments.

FIG. 5 is a block diagram of the facsimile apparatus 1. Referring to FIG. 5, the following components are connected to a CPU 101: a ROM 102, a RAM 103, an operation switch section 9, a sensor 1 section 105 constituted by the above-mentioned DES sensors 22 and the RPS sensors 24, a voltage converter 106 for obtaining a voltage of 5 V from a single power supply voltage (12 V) applied from the rechargeable battery 11, a buzzer section 107 for informing an operation/action state, a reading section 108 for processing a read signal from the contact sensor 12, a recording section 109 for outputting a recording signal by using the line thermal head 14, a driving section 110 for driving the pulse motor 30 in a predetermined manner, a MODEM 111 for converting a line signal, and an NCU 1 section 112 connected to a line connector 6a or a mobile telephone connector 6b.

A contact section 35 indicated by the broken line in FIG. 5 is a connection for external connection, which is used to add a function to the facsimile apparatus 1 described above. The contact section 35 is arranged on the connector board 27.

Figure 6:
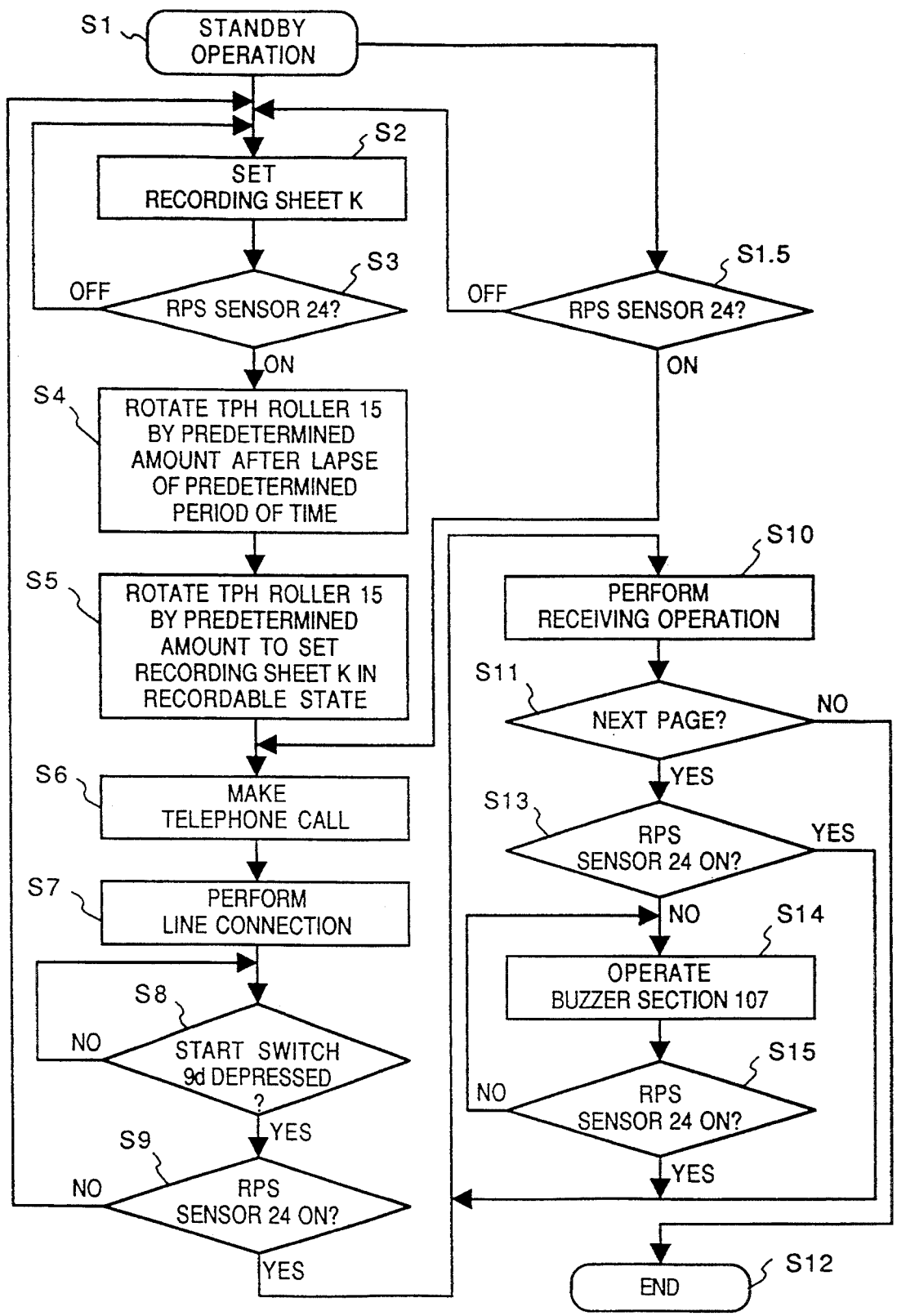
FIG. 6 is a flow chart showing a reception mode.
Figure 7:
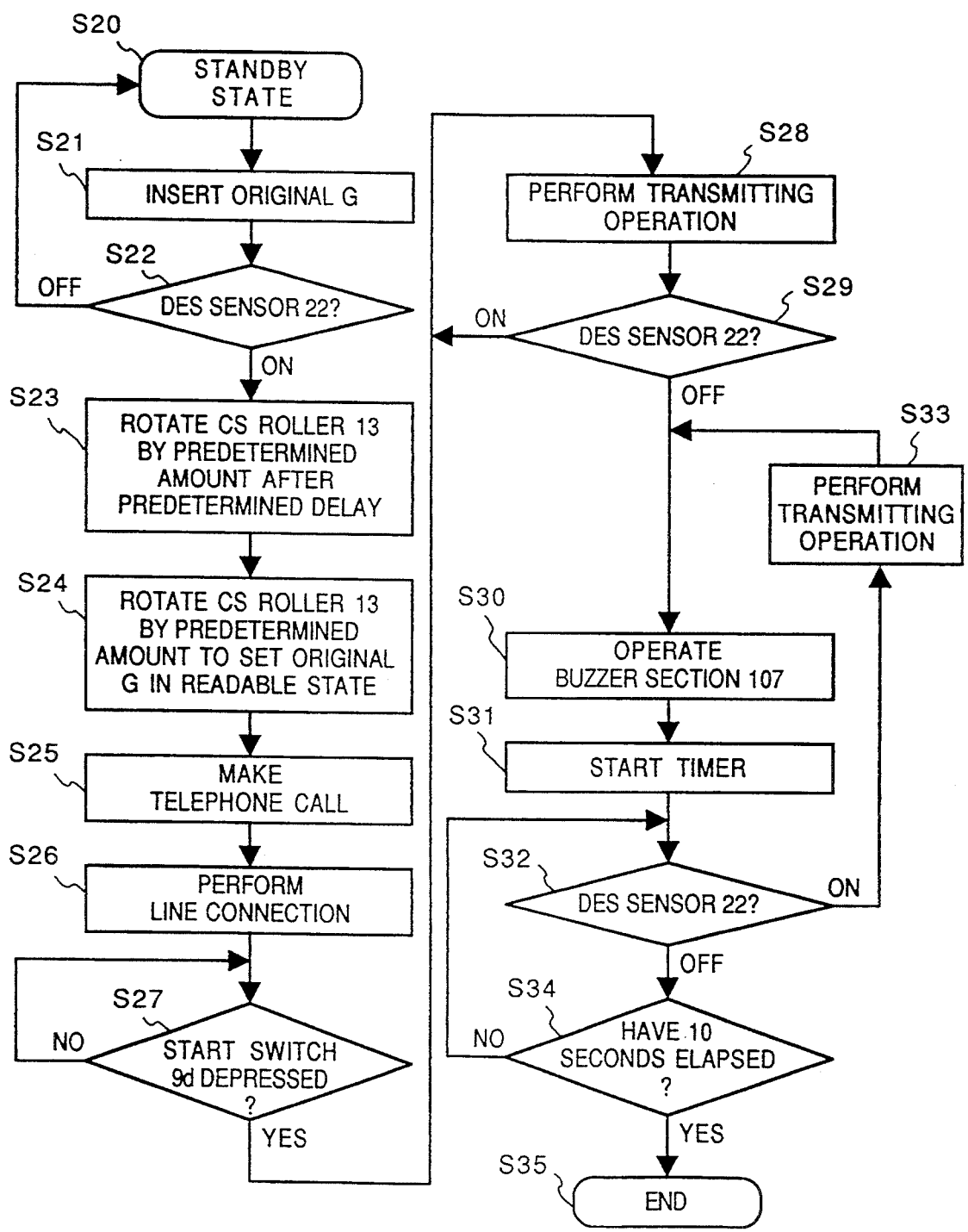
FIG. 7 is a flow chart showing a transmission mode.

Operations of the apparatus having the above arrangement in the reception and transmission modes will be described below with reference to the flow charts shown in FIGS. 6 and 7. Referring to FIG. 6, a standby state is set in step S1. If a recording sheet has already been set, it is determined in step S1.5 that the RPS sensor 24 is ON, and the flow advances to step S6. If no recording sheet is set, and the RPS sensor 24 is OFF, the flow advances to step S2 to set a recording sheet K (the cut sheet K1 or the roll paper K2). The flow then advances to step S3 to check the presence/absence of the recording sheet K by using the RPS sensor 24. If it is determined that the RPS sensor 24 is ON, the flow advances to step S4. In step S4, the TPH roller 15 is pivoted by a predetermined amount after a lapse of a predetermined period of time so as to bring the leading end portion of the recording sheet K into the gap between the TPH roller 15 and the thermal head 14, thereby eliminating any skew or slant of the recording sheet K.

In step S5, the TPH roller 15 is pivoted by a predetermined amount to set the recording sheet K in a recordable state. In step S6, a telephone call is made with respect to the transmitting end. In step S7, line connection is performed. In step S8, the start switch 9d is depressed. Thereafter, the flow advances to step S9 to check the presence/absence of the recording sheet K again by using the RPS sensor 24. If the RPS sensor 24 is turned on, a reception operation is started in step S10, and a recording operation is completed. The flow then advances to step S11 to check the presence/absence of the next page from the transmitting end. If NO in step S11, the receiving operation is ended (step S12).

If YES in step S11, the flow advances to step S13 to wait for the second recording sheet K to be set. If the RPS sensor 24 is turned on upon detection of the presence of the recording sheet K, the flow advances to step S10 to execute a receiving operation. If it is determined in step S13 that the RPS sensor 24 is not turned on after a lapse of a predetermined period of time, the flow advances to step S14 to operate the buzzer section 107 so as to urge the user to set a recording sheet K. If the recording sheet K is set, and it is determined in step S15 that the RPS sensor 24 is turned on, the flow advances to step S10 to execute a receiving operation. Subsequently, a similar operation is repeated to perform reception of a predetermined number of pages.

An operation in the transmission mode will be described next with reference to the flow chart shown in FIG. 7. When the start switch 9d is depressed, a standby state is set in step S20 to wait for a transmitting operation. The flow then advances to step S21 to set an original G. If it is determined in step S22 that the DES sensor 22 is turned on upon detection of the presence of the original G, the flow advances to step S23 to pivot the CS roller 13 by a predetermined amount after a lapse of a predetermined period of time to bring the leading end portion of the original G into the gap between the CS roller 13 and the contact sensor 12, thereby eliminating/correcting any skew of the original G.

In step S24, the CS roller 13 is pivoted by a predetermined amount to set the original G in a readable state. In step S25, a telephone call is made with respect to the receiving end. In step S26, line connection is performed. In step S27, the start switch 9d is depressed. Thereafter, the flow advances to step S28 to start a transmitting operation. In step S29, the presence/absence of the trailing edge portion of the original G is checked. If NO in step S29, the transmitting operation is ended (step S29).

After the transmitting operation is completed, the flow advances to step S30 to operate the buzzer section 107 to urge the user to set the next original G. The flow then advances to step S31 to start an internal timer. If it is determined in step S32 that the DES sensor 22 is ON, the flow advances to step S33 to execute a transmitting operation. If the OFF state of the DES sensor 22 continues for 10 seconds in step S34, the absence of the next original is determined. The processing is then ended in step S35.

Figure 8A:
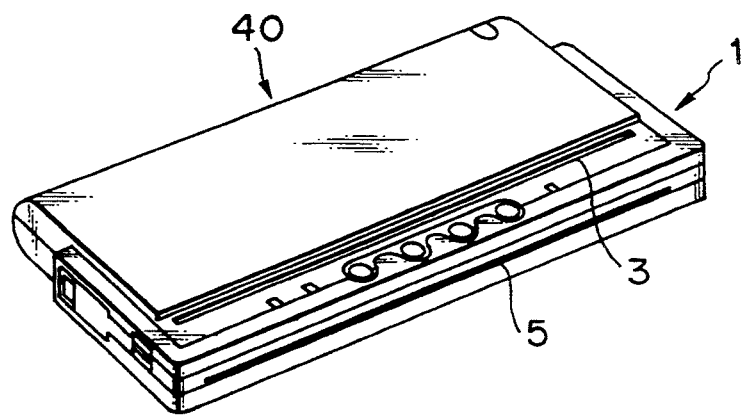
FIG. 8A is a perspective view showing the outer appearance of an ultra compact facsimile apparatus 1 in FIGS. 1A and 1B, with which a roll sheet holder 40 is combined.
Figure 8B:
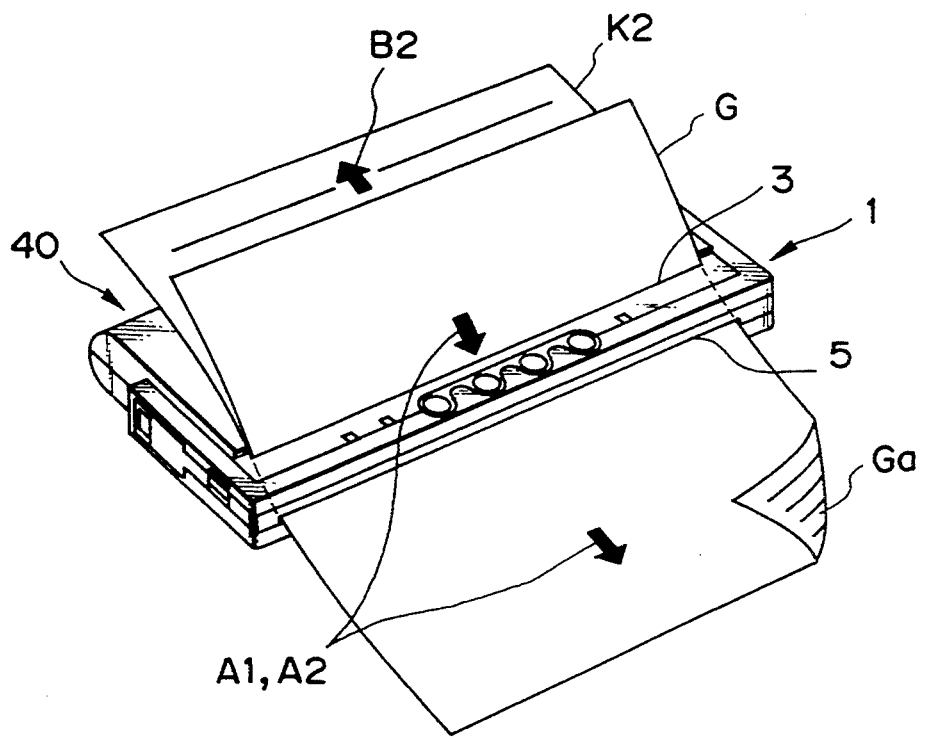
FIG. 8B is a perspective view showing the outer appearance of the apparatus in FIG. 8A in a used state.

FIG. 8A is a perspective view showing the outer appearance of the facsimile apparatus 1 in FIGS. 1A and 1B, with which a roll sheet holder 40 is combined. FIG. 8B is a perspective view showing the outer appearance of the apparatus in a used state. Referring to FIG. 8A, the roll sheet holder 40 consisting of a heat-resistant resin material is detachably combined with the facsimile apparatus 1. In the combined state shown in FIG. 8A, the above-mentioned operation switch section, first opening portion 3, and external connector 6 are exposed.

In the combined state, as shown in FIG. 8B, the original G is inserted, with the image surface Ga facing down, through the first opening portion 3 and is conveyed from the discharge port 5 in the directions indicated by arrows A1 and A2, and the roll paper K2, i.e., a roll of thermal recording paper, is conveyed/discharged outside from the rear side of the first opening portion 3 in a direction of an arrow B2.

Figure 9A:
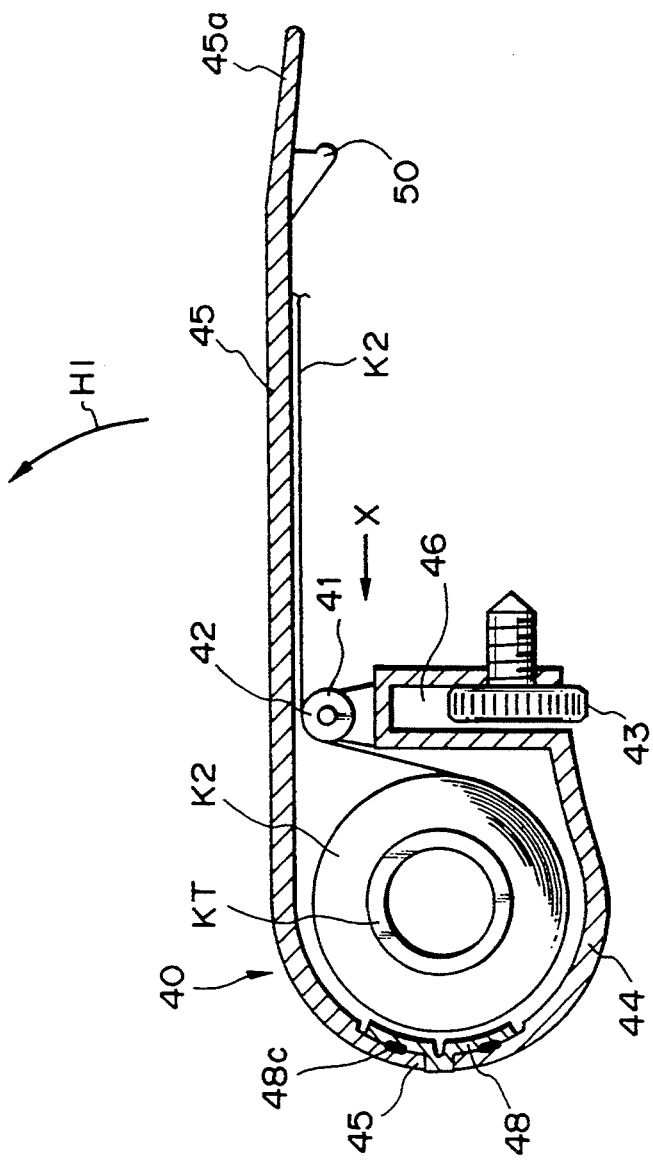
FIG. 9A is a cross-sectional view of the roll sheet holder 40.
Figure 9B:
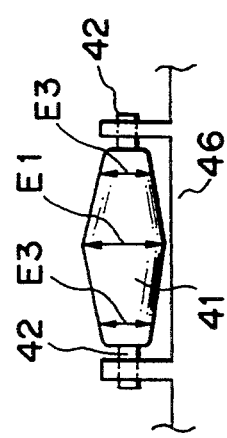
FIG. 9B is a view taken in the direction of an arrow X in FIG. 9A.

FIG. 9A is a cross-sectional view of the roll sheet holder 40. FIG. 9B is a view taken in a direction of an arrow X in FIG. 9A. Referring to FIG. 9A, the base of the roll sheet holder 40 is constituted by a base portion 44 for storing the roll paper K2 wound around a core KT, and a mounting portion 46 formed to be continuous with the right edge portion of the base portion 44. One portion of a hinge 48 is fixed to the left edge portion (rear end) of the base portion 44, while an end portion 45b of a cover portion 45 is fixed to the other portion of the hinge 48 such that the cover portion 45 can be freely opened/closed in the direction indicated by an arrow H1. A distal end portion 45a of the cover portion 45 is long enough to cover the second opening portion 4 of the facsimile apparatus 1. In addition, a stopper 50 is integrally formed on the lower surface of the distal end portion 45a. When this stopper 50 is locked in the second opening portion 4, the cover portion 45 can be held closed.

A fixing screw 43 is arranged inside the mounting portion 46 such that part of the knurled portion is exposed to allow the user to rotate the screw 43 with his/her finger. A bearing 42 is disposed above the mounting portion 46. The bearing 42 pivotally supports an alignment roller 41 as a slanting movement preventing member which prevents meandering/slanting movement of the roll paper K2 and also guides the roll paper K2 between the second opening portion 4 and itself while the roll paper K2 is separated from the upper surface of the facsimile apparatus 1.

As shown in FIG. 9B, the alignment roller 41 has a barrel-like shape, i.e., a diameter E1 of a central portion is set to be larger than a diameter E2 of a peripheral portion. As will be described later with reference to FIG. 12, only one alignment roller 41 is arranged near the center line of the roll paper K2. With the above-described alignment roller 41, tension can be caused to concentrate near the center line of the roll paper K2 so as to prevent meandering/slanting movement of the roll paper K2. In addition, since the roll paper K2 can be guided while it is separated from the upper surface of the facsimile apparatus 1, damage to the recording surface can be prevented.

Figure 10:
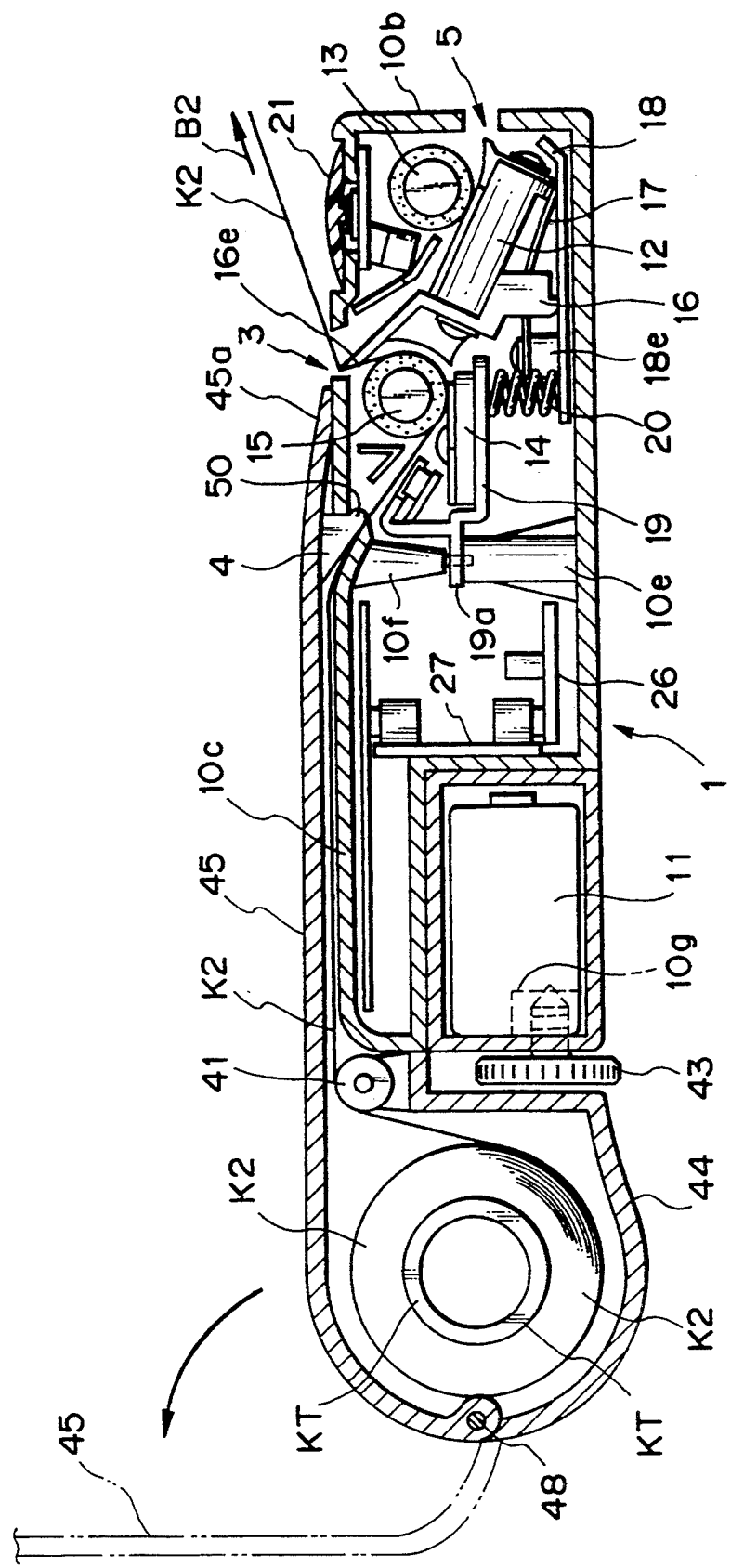
FIG. 10 is a cross-sectional view showing the roll sheet holder 40 and the ultra compact facsimile apparatus 1 after they are combined with each other.

FIG. 10 is a cross-sectional view of the roll sheet holder 40 and the facsimile apparatus 1 which are combined with each other, illustrating a state wherein the roll paper K2 is cut. The same reference numerals denote the same parts as those described above, and a description thereof will be omitted. A fixing screw portion 10g (or portions 10g) indicated by the broken line in FIG. 10 is formed in one side (or two sides) of the rechargeable battery 11 so as to allow the fixing screw 43 to be threadably engaged therewith, thereby allowing the fixed/combined state shown in FIG. 10. The cover portion 45 is pivotally held by a pivot shaft 48 in place of the above hinge and can be opened to the position indicated by the alternate long and two short dashed lines in FIG. 10.

In the above-described state, after the roll paper K2 is inserted through the second opening portion 4 and is caused to pass under the lower outer surface of the TPH roller 15 of the recording section, it can be guided along the rear side of the sharp portion 16e of the sensor base plate 16 to come outside through the first opening portion 3. When the roll paper K2 is pulled in the direction indicated by an arrow B2 in FIG. 10, the roller paper K2 can be cut with the sharp portion 16e. In the conventional apparatus, since the roll paper K2 exhibits a strong tendency to curl as it is consumed to such an extent that the diameter becomes close to that of the core KT, the roll paper K2 enters the recording section again through the second opening portion 4 upon recording. However, in this embodiment, since the second opening portion 4 is covered with the cover portion 45, such an inconvenience can be prevented.

When the roll paper K2 is to be replaced, the cover portion 45 is opened to the position indicated by the alternate long and two short dashed lines in FIG. 10, and the remaining roll paper K2 and the core KT are removed.

Figure 11A:
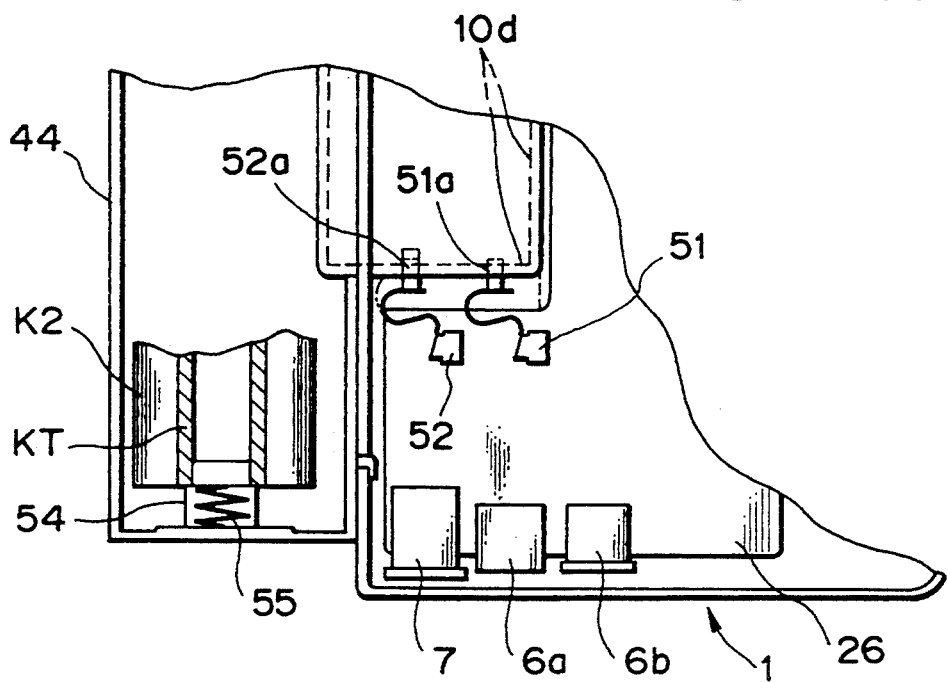
FIG. 11A is a partially enlarged plan view of the ultra compact facsimile apparatus 1.
Figure 11B:
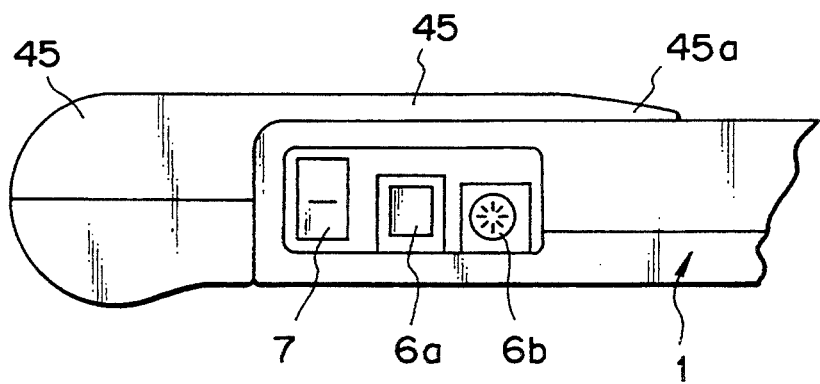
FIG. 11B is a side view of the ultra compact facsimile apparatus 1.
Figure 13:
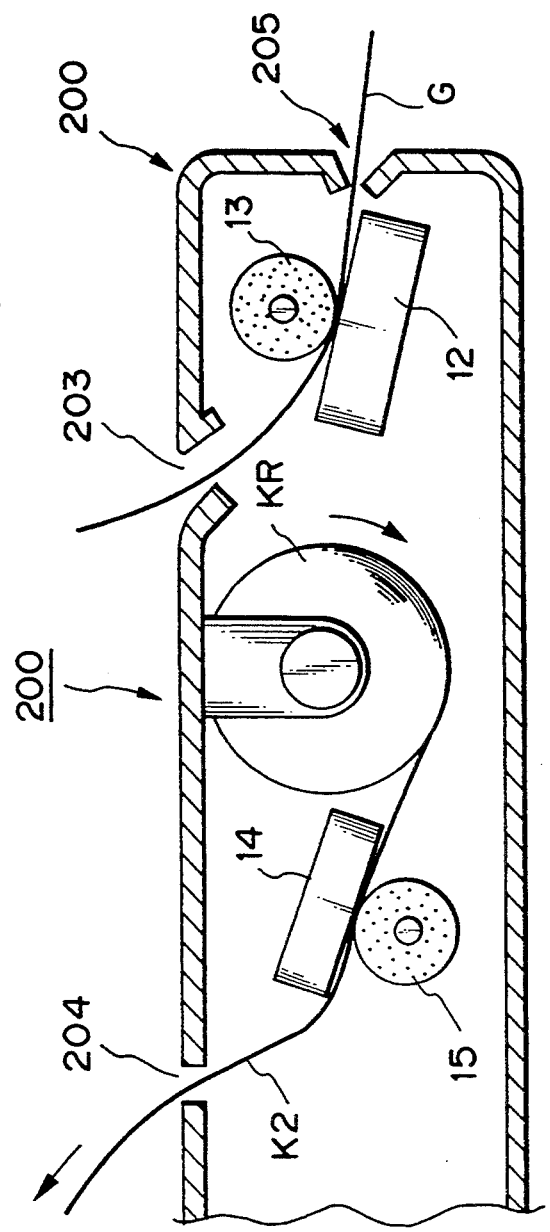
FIG. 13 is a cross-sectional view of a conventional facsimile apparatus.

FIG. 11A is an enlarged plan view showing part of the facsimile apparatus 1. FIG. 11B is a side view of the apparatus in FIG. 11A. Both FIGS. 11A and 11B show a state wherein the roll sheet holder 40 is combined with the apparatus. Referring to FIG. 11A, one guide shaft 54 which receives a compressing force of a coil spring 55 is arranged on one side surface portion of the base portion 44 of the roll sheet holder 40 so as to be inserted in the inner through hole of the core KT of the roll paper K2. The other guide shaft 54 (which may be of a stationary type) is arranged on the other side surface of the base portion 44. The roll paper K2 is axially supported between these two guide shafts 54 to be pivotal and replaceable.

A switch 7 and connectors 6a and 6b are mounted on the above-described discrete board 26. In addition, battery contacts 51 and 52 are mounted outside the cover battery storage portion 10d in such a manner that contacts 51a and 52a are caused to protrude in a biased state maintained by the elasticity of the material for the contacts 51 and 52. The respective components are mounted in this manner to expose the switch 7 and the connectors 6a and 6b, as shown in FIG. 11B. With this arrangement, when the rechargeable battery 11 is set in the main body from the above-mentioned direction, connection of the battery can be completed to allow supply of power to the apparatus.

FIG. 12 is a plan view of part of the roll sheet holder 40 and the facsimile apparatus 1 after they are combined with each other, illustrating a state wherein rolls of paper K2 having different sizes are respectively loaded in the base portion 44 of the roll sheet holder 40, and the positional relationship between them and the alignment roller 41. As shown in FIG. 12, A4 size (width) roll paper K2 indicated by the broken lines and B4 size (width) roll paper K2 indicated by the alternate long and short dashed lines can be loaded in the base portion 44 of the roll sheet holder 40. In order to cause center lines CL of two rolls of paper of the respective sizes to coincide with each other, spacers 53 having almost the same total lengths are set at the left and right guide shafts 54. Since the center lines of rolls of paper K2 having different sizes are caused to coincide with each other in this manner so as not to change the positional relationships of the center lines relative to the above alignment roller 41, meandering/slanting movement of each rolls of paper K2 can be prevented.

Note that the above-described roll sheet holder 40 can be applied to not only a facsimile apparatus but also any printer apparatus using a roll-like recording sheet.

As has been described above, there is provided a roll-like sheet holder for a facsimile apparatus, which allows the apparatus to selectively use a cut sheet and a roll-like recording sheet, can be formed into a compact, flat structure, can prevent damage to the recording surface of a recording sheet, and can prevent meandering/slanting movement of the recording sheet.

Note that the present invention is not limited to the embodiments of the present invention. It is apparent that various changes and modifications can be made within the spirit and scope of the invention.

What is claimed is:

1. A portable facsimile apparatus comprising:
   a housing constituting an outer surface of said portable facsimile apparatus;
   a first opening portion formed in a front portion of an upper surface of said housing, said first opening portion provided to insert an original;
   a front surface opening portion formed in a front surface of said housing;
   an original reading section for reading an original while conveying said original between said first opening portion and said front surface opening portion, said original reading section arranged on a front portion of said housing;
   a second opening portion formed in the upper surface of said housing at a position closer to a rear side of the upper surface of said housing than said first opening portion, said second opening portion provided to insert a recording sheet from outside of said housing;
   a recording section for recording onto said recording sheet while conveying said recording sheet between said second opening portion and said first opening portion, said recording section arranged close to said original reading section in said housing;
   a battery storage portion for storing a battery that drives said original reading section and said recording section, said battery storage portion arranged at a rear portion of said recording section, thus constituting said housing both flat and compact; and
   a roll-like sheet holder for holding and supplying a roll-like recording sheet, which is attached at a rear portion of said housing, wherein said roll-like recording sheet is inserted, via said second opening portion, into said housing.

2. An apparatus according to claim 1, wherein said original reading section comprises a contact line image sensor and a first convey roller which is pivoted and driven while said contact line image sensor is biased against the first convey roller, and
   said recording section comprises a line thermal head and a second convey roller which is pivoted and driven while said line thermal head is biased against the second convey roller, in order to use a thermal recording sheet as the recording sheet.

3. An apparatus according to claim 2, wherein said first and second convey rollers are arranged at almost the same level in said housing, and said contact line image sensor and said line thermal head are arranged to be biased toward the upper surface of said housing, thereby setting said first and second convey rollers biased toward the upper surface of said housing.

4. An apparatus according to claim 2, wherein an original convey path for an original and a sheet convey path for the thermal recording sheet are arranged between said line thermal head and said contact line image sensor to be adjacent to each other so as to convey the original and the thermal recording sheet from the first opening portion.

5. A portable facsimile apparatus according to claim 1, said original reading section further having a reading head and a first convey roller;
   said recording section further having a recording head and a second convey roller; and
   further comprising drive means, for driving said first convey roller and said second convey roller, which receives electricity from the battery stored in said battery storage portion.

6. An apparatus according to claim 5, wherein said original reading section and said recording section are offset toward one side surface of said housing to ensure a space, thereby allowing storage of a drive/transmission system of said driving source.

7. An apparatus according to claim 1, wherein said roll-like sheet holder comprises:
   a storage portion for holding said recording sheet with a recording surface thereof facing outside in such a manner that the recording sheet can be rotated and continuously supplied;
   a cover member having one end supported on said storage portion such that said cover member can be freely opened/closed, and the other end covering the second opening portion in a separated state therefrom; and
   a slanting movement preventing member, arranged near a downstream portion of said storage portion, for preventing meandering/slanting movement of the recording sheet, and guiding the recording sheet between the second opening portion and itself with the recording sheet being kept separated from the upper surface of said housing.

8. An apparatus according to claim 7, wherein said cover member essentially consists of a resin material having at least heat resistance.

9. An apparatus according to claim 7, wherein said slanting movement preventing member is arranged at a substantially central portion along a longitudinal direction of said storage portion, and said apparatus further comprises a support member for supporting recording sheets having different widths such that centers of the recording sheets in a direction of width thereof substantially coincide with a center of said storage portion along the longitudinal direction thereof.

10. A facsimile apparatus comprising:

a housing constituting an outer surface of said facsimile apparatus;

an original insert port formed in an upper surface of said housing;

an original discharge port formed in a front surface of said housing;

an original reading section for reading an original while conveying said original between said original insert port and said original discharge port, said original reading section arranged on a front portion of said housing;

a recording sheet insert port formed in the upper surface of said housing at a position closer to a rear side of the upper surface of said housing than said original insert port, said original insert port provided to insert a recording sheet from outside of said housing;

a recording sheet discharge port formed in an upper surface of said housing and arranged close to said original inset port;

a recording section for recording onto said recording sheet while conveying said recording sheet between said recording sheet insert port and said recording sheet discharge port, said recording section arranged close to said original reading section in said housing;

a battery storage portion for storing a battery that drives said original reading section and said recording section; and a roll-like sheet holder for holding and supplying a roll-like recording sheet, which is attached at a rear portion of said housing, wherein said roll-like recording sheet is inserted via said recording sheet insert port into said housing.

11. An apparatus according to claim 10, wherein said battery storage portion and a cover member of said roll-like sheet holder essentially consist of a resin material having at least heat resistance.

12. A facsimile apparatus, having a detachable roll-like sheet holder, comprising:

a housing constituting an outer surface of said facsimile apparatus;

a reading section for reading an original which is conveyed between an original insert port and an original discharge port being provided on said housing;

a recording section for recording onto a recording sheet which is conveyed between a recording sheet insert port and a recording sheet discharge port being provided on said housing;

a mounting section, which is provided on the side surface of said housing and detachably mounting said roll-like sheet holder, wherein said mounting section allows insertion of a roll-like sheet into said recording sheet insert port instead of a cut-sheet when said roll-like sheet holder is mounted to said housing.

13. A portable facsimile, apparatus having a detachable roll-like sheet holder, comprising:

a housing constituting an outer surface of said portable facsimile apparatus;

an original insert port formed in an upper surface of said housing;

an original discharge port formed in a front surface of said housing;

a reading section for reading an original which is conveyed between said original insert port and said original discharge port;

a recording sheet insert port formed in the upper surface of said housing at a position closer to a rear side of said housing than said original insert port;

a recording sheet discharge port formed in the upper surface of said housing at a position close to said original insert port;

a recording section for recording onto a recording sheet which is conveyed between said recording sheet insert port and said recording sheet discharge port;

a battery storage section for storing a battery that supplies electricity to said reading section and said recording section; and a mounting section which is provided on the side surface of said housing and detachably mounting said roll-like sheet holder, wherein said mounting section allows insertion of a roll-like sheet into said recording sheet insert port instead of a cut-sheet when said roll-like sheet holder is mounted to said housing.

* * * * *

UNITED STATES PATENT AND TRADEMARK OFFICE
CERTIFICATE OF CORRECTION

PATENT NO. : 5,448,374
DATED : September 5, 1995
INVENTOR(S) : MINORU YOKOYAMA, ET AL.

It is certified that error appears in the above-identified patent and that said Letters Patent is hereby corrected as shown below:

COLUMN 5

Line 1, "abovede-" should read --above-de- --.
Line 42, "firsgt" should read --first--.

COLUMN 6

Line 45, "abovemen-" should read --above-men- --.

COLUMN 7

Line 44, "difference" should read --different--.
Line 47, "difference" should read --different--.

COLUMN 11

Line 25, "rolls" should read --roll--.

UNITED STATES PATENT AND TRADEMARK OFFICE
CERTIFICATE OF CORRECTION

PATENT NO.   : 5,448,374
DATED        : September 5, 1995
INVENTOR(S)  : MINORU YOKOYAMA, ET AL.

Page 2 of 2

It is certified that error appears in the above-identified patent and that said Letters Patent is hereby corrected as shown below:

COLUMN 14

Line 18, "facsimile," should read --facsimile--.

Signed and Sealed this

Thirtieth Day of April, 1996

Attest:

BRUCE LEHMAN

Attesting Officer   Commissioner of Patents and Trademarks